(No Model.) 2 Sheets—Sheet 1.
W. R. DE VOE.
CONDUIT ELECTRIC RAILWAY.
No. 499,374. Patented June 13, 1893.
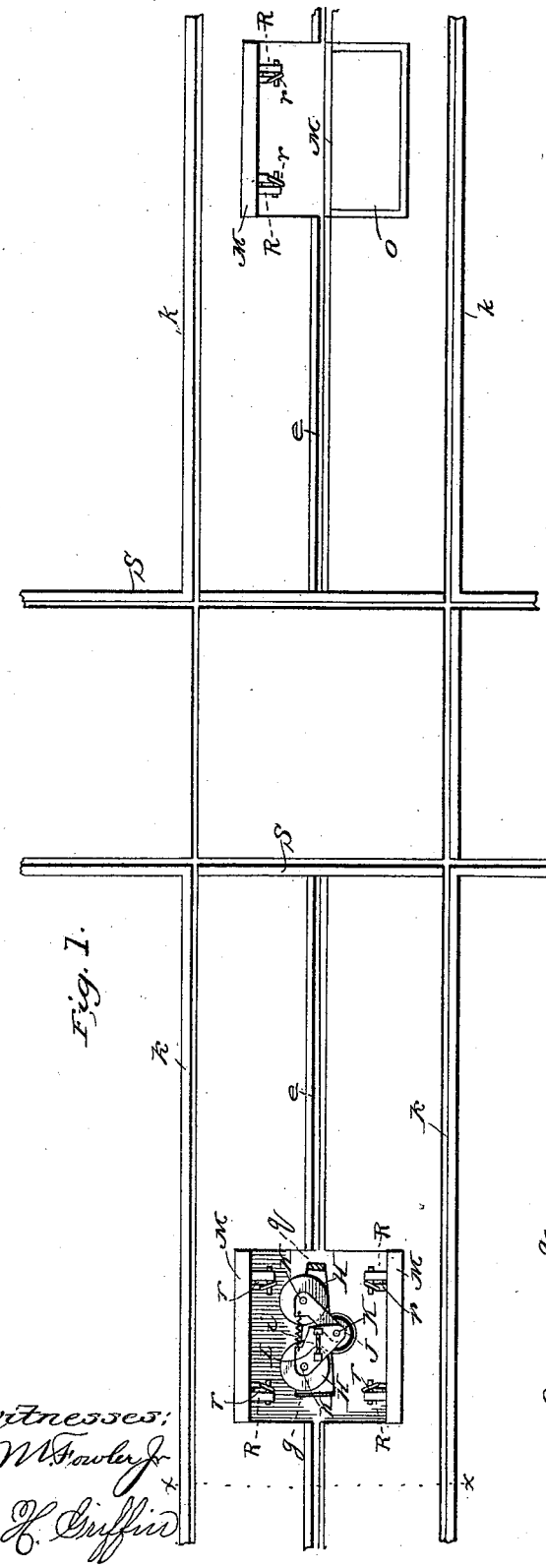
Fig. 1.
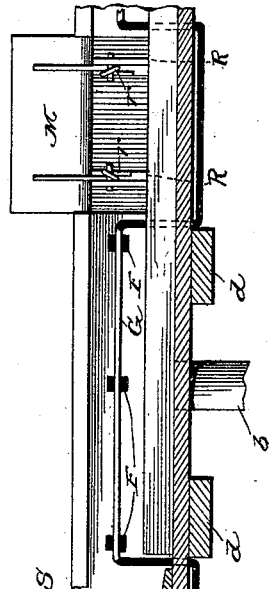
Fig. 2.
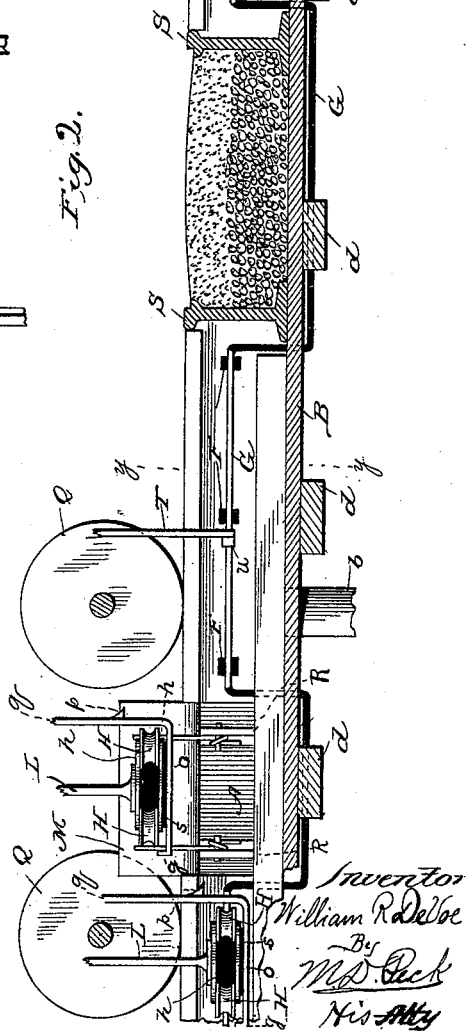
Witnesses:
J. M. Fowler Jr.
J. H. Griffin
Inventor
William R. DeVoe
By M. D. Peck
His Atty (No Model.) 2 Sheets—Sheet 2.
W. R. DE VOE.
CONDUIT ELECTRIC RAILWAY.
No. 499,374. Patented June 13, 1893.
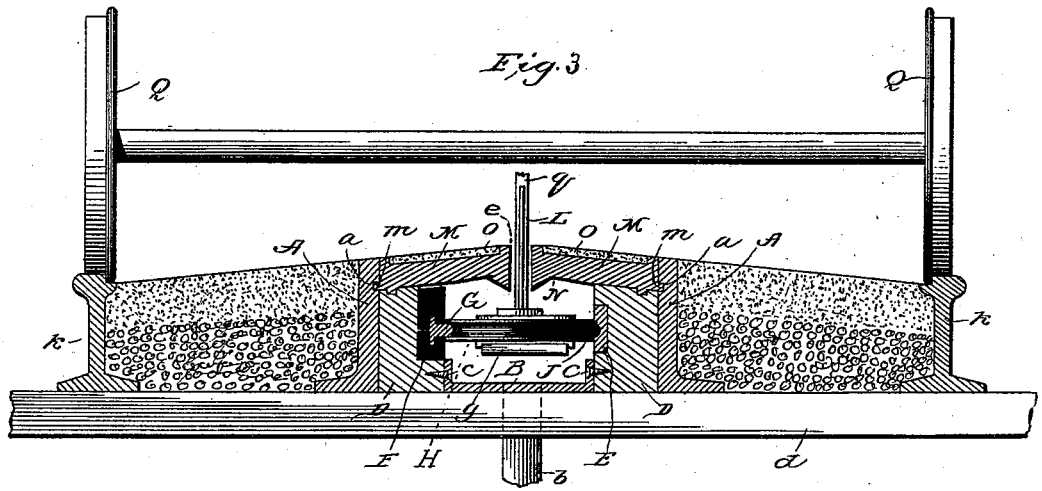
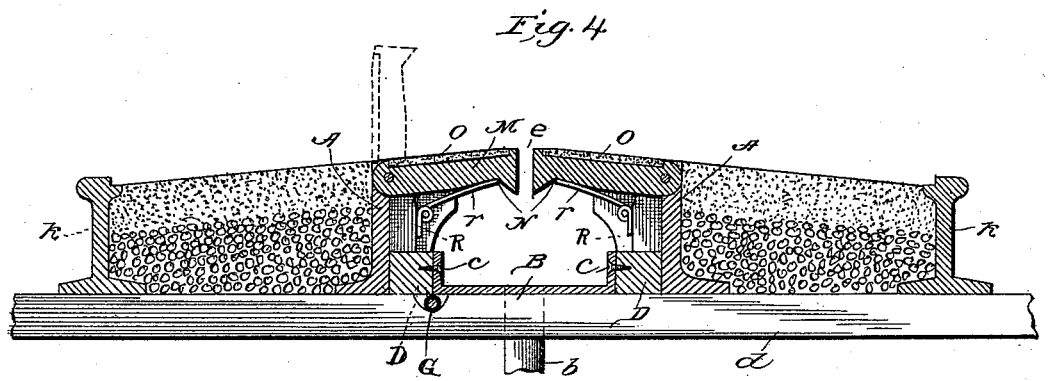
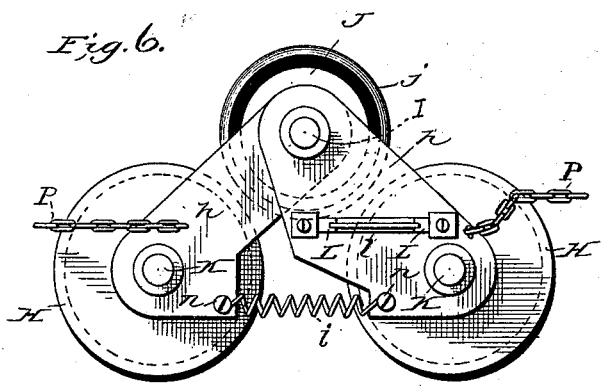
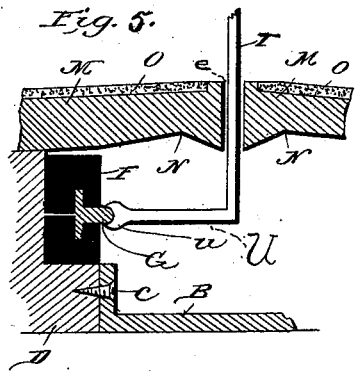
Witnesses:
J. M. Fowler Jr.
J. H. Griffin
Inventor:
William R. DeVoe
By M. D. Peck
His Attorney.

UNITED STATES PATENT OFFICE.

WILLIAM R. DE VOE, OF SHREVEPORT, LOUISIANA.

CONDUIT ELECTRIC RAILWAY.

SPECIFICATION forming part of Letters Patent No. 499,374, dated June 13, 1893.

Application filed October 28, 1892. Serial No. 450,203. (No model.)

*To all whom it may concern:*

Be it known that I, WILLIAM R. DE VOE, a citizen of the United States, residing at Shreveport, in the parish of Caddo and State of Louisiana, have invented certain new and useful Improvements in Underground Conduits for Railway-Conductors; and I do hereby declare the following to be a full, clear, and exact description of the invention, such as will enable others skilled in the art to which it appertains to make and use the same, reference being had to the accompanying drawings, which form part of this specification.

My invention relates to underground conduits for conductors, used to convey a current of electricity to propel railway cars; and to a trolley to be used in connection therewith, and has for its object to provide a conduit supported on the sleepers or cross ties midway between the tracks and below the surface of the road bed, in which the conductor is supported; to provide a system of drainage from the conduit; and to provide means whereby the trolley may be lifted out of the conduit in order to permit the car to cross an intersecting line of railway, and consists of the construction and arrangement of parts hereinafter described and more particularly pointed out in the claims.

Referring to the drawings: Figure 1, is a plan view of a track provided with my improved conduit, showing the arrangement to permit the removal of the trolley from the conduit to enable the car to cross an intersecting track. Fig. 2, is a vertical longitudinal section of Fig. 1, showing the trolley in two different positions. Fig. 3, is a cross section taken on the line $x$—$x$, Fig. 1, with the wheels of a car mounted on the track and showing the trolley in position. Fig. 4, is a similar section through that portion of the track and conduit where the trolley is removed from the conduit. Fig. 5, is a sectional view on the line $y$—$y$ of Fig. 2, of a portion of the conduit, showing the use of a supplemental contact bar or rod; and, Fig. 6, is a plan view of the trolley.

Similar letters of reference indicate corresponding parts in each figure of the drawings.

A. represents angle irons secured to the sleepers or cross ties $d$, and having their upper edges on a level with the road bed. Stringers D are preferably composed of wood and are supported on the sleepers $d$, and run parallel with the track rails $k$, and rest against the inner edge of the vertical portions of angle-irons A. and extend to about two-thirds of the height thereof.

B. represents a trough extending longitudinally between the stringers D and supported on the cross ties $d$. This trough may be secured to the stringers D by screws $c$, or by other suitable means, and it, in connection with the angle irons A will prevent the stringers D from having lateral movement on the cross ties $d$. The trough B is shallow and extends the entire length of the conduit, it being provided at suitable intervals in its length with drainage pipes $b$, which communicate with a sewer, or other means of outlet, for the purpose of carrying off any water that may find its way into the conduit and so keep the latter in a comparatively dry state.

The stringer D on one side of the conduit is recessed at intervals in its length to receive the insulating blocks F, the latter being secured in the recesses in any suitable manner. These insulators are preferably made in two sections and are recessed to fit over the flange on the base of the line conductor G. and when secured in the recesses in the stringer D will securely hold the conductor in position. The line conductor is of such size as to project a short distance out from the insulators, and this projecting part is rounded to adapt it to the grooved wheels H of the trolley, which run upon it. The stringer D on the opposite side from the conductor is grooved to receive a concave track E in which the convex rim $j$, of the wheel J, composed of any suitable insulating material is made to run.

The trolley consists of a frame made up of four plates $h$, two of which are on each side of the grooved contact wheels H, and the convex rimmed insulated wheel J, all of which are pivoted between the plates. One end of each plate $h$, is pivoted on the axle of the wheel J and the wheels H are mounted on axles which pass through the free ends of the plates. These wheels are normally drawn toward each other by coil springs $i$, fastened to the free ends of the plates $h$, by screws $n$, or other suitable means, and the traction of these springs has a tendency to increase the width of the trolley and thereby keep the wheels H, and J, firmly pressed against the conductor G, and the track E respectively. To the upper face of one of the plates $h$, is secured, in any suitable manner, a conductor L. which leads to the motor on the car. This conductor is insulated in any desired way to prevent the current passing from it to the metal guard plates or covers M or any other body other than that to which it is desired to conduct the current.

At about the center of the width of the trolley small chains P are secured to the plates $h$, which are attached to the under side of the car in front and rear of the trolley for the purpose of drawing the trolley back and forth upon the track. These attaching chains are secured to the plates $h$, on the same line with the insulated conductor L and are drawn through the same slot between the guard plates M.

The inner faces of the angle irons A. near the top edge are provided with a recess $a$, to receive a portion of the edge $m$, of a guard plate or cover M that extends the entire length of the conduit. These guard plates extend inwardly from the angle irons A and are supported on the stringers D, a space being left between their inner edges of about one half inch, which forms a slot $e$, through which the conductor L moves when the car is in motion. In the under side of the guard plates a longitudinal groove N is formed which extends parallel with the road tracks, and is for the purpose of preventing any water that may run down the sides of the slot from running back on the under side of the guard plate to the line conductor G or the track E.

The guard plates M are recessed on their upper surfaces to receive a covering of asphalt O, which is made to decline outwardly from near the inner edge of the plate to near the angle irons and the road bed is made to slope gradually to the track rails and thence to the gutters at the sides of the road. The space between the angle irons A and the track rails may be filled with any desired form of blocks or concreting best suited to the requirements of the road way.

The means employed to lift the trolley from the track, and at the same time to connect the line conductor with the car, when it becomes necessary to cross an intersecting track, are shown in Figs. 1, 2 and 4.

S. represents the rails of the intersecting track, on either side of which and at a suitable distance therefrom, are hinged sections of the guard plates or covers M, to the angle irons A, on each side of the conduit. At a point coincident with the end of the hinged section farthest from the intersecting track, the conductor G is bent abruptly downward and carried through between the inner edge of the stringer D and the outer side of the trough B, thence under the edges of the stringer and trough for the length of the hinged sections, then up again between the stringer and trough B, when it is again bent to take its proper position in the conduit, until it reaches the intersecting track. It will then be again carried down between the stringer D and the trough B under the intersecting track, and then again up into its proper position in the conduit which it occupies until it reaches the other hinged sections when it again passes out of and into the conduit as before described and clearly shown in Fig. 2.

That portion of the conductor that passes out of its normal position in the conduit is insulated, as shown in Figs. 2 and 4. At a point in the conduit opposite that where the conductor ceases to occupy its normal position, the track E also ends, and when the trolley reaches this point it will run off the conductor G and track E.

In order to support the trolley after it leaves the track, a bar $q$, is provided which is secured to the car in any suitable manner, so as to be raised or lowered. This bar passes down through the slot between the guard plates M and is bent at a right angle to form an arm $o$, which extends under the trolley. This arm is preferably a plate about half as wide as the trolley, having its rear end turned up to form a flange as shown at $g$, and is provided with an insulator $s$, on its upper surface where it comes in contact with the plates $h$, on the under side of the trolley. On the front side of the vertical portion of the bar there is a spur $p$, which, just enters the slot between and at the lower edges of the guard plates M, when the rod is in its normal position, and serves to clear the slot of any obstruction that might otherwise be the cause of injury to the contact post L or the flexible conducting wire $l$.

The hinged sections M should be of sufficient length to enable the operator when the car is stopped, to raise the trolley out of the conduit after it leaves the track E and conductor G. The hinged sections may be raised by any suitable means before the car reaches them, and to aid in lifting them there are provided torsion springs $r$, secured at one end to recessed bracket supports R which rest on the upper side of the stringers D, cut away to receive them in the conduit, and the other ends of the springs bearing against the under side of the hinged sections of the guard plate or cover M.

For the purpose of carrying the car across the intersecting track a bar T is attached to the car so as to be raised out of or lowered into the conduit through the slot $e$, between the guard plates M. The lower end of this bar is bent as shown in Fig. 5, to form an arm U, which is adapted to be turned to bring the bent portion in line with the slot $e$, to enable it to be moved into or out of the conduit. The inner end of the arm U is provided with a contact block $u$, adapted to engage and slide on the conductor G, and is so connected to the motor on the car, that when the contact block is in engagement with the conductor, the current will be conveyed to the motor.

When the trolley runs off the track E and conductor G, the car will be stopped by the operator who will then lift the trolley out of the conduit by means of the bar $q$, and its plates $o$. The bar T must then be lowered into the conduit and its block $u$, turned so as to engage the conductor G when the motor will be operated to give the car sufficient momentum to carry it across the intersecting track. The bar T must be lifted out of the conduit before it reaches the intersecting track and again lowered into the conduit after the intersecting track is crossed, and brought into contact with the conductor G to cause the car to run to the other hinged sections of the plates M, where the trolley is again lowered into the conduit and brought into proper position on the track E and conductor G.

Having thus fully described my invention, what I claim, and desire to secure by Letters Patent, is—

1. An underground conduit for electric conductors provided with a slotted cover, having hinged sections a line conductor supported on one side of the conduit, a track supported on the opposite side of the conduit, a trolley having horizontally arranged wheels to engage the conductor and the track, combined with means for lifting the trolley from the conduit through the hinged section before crossing an intersecting car track, substantially as described.

2. An underground conduit for electric conductors, provided with a slotted cover, sections of said cover being hinged to the conduit, and having springs bearing against their under sides, combined with means for lifting the trolley out of the conduit through the sections, substantially as described and for the purpose set forth.

3. An underground conduit having a slotted cover, sections of said cover being movable and having a hinged connection with the conduit, combined with a line conductor supported in the conduit its entire length except at those portions which have the movable sections of the slotted cover, where it passes out of the conduit, substantially as described.

4. An underground conduit having a slotted cover, sections of said cover being movable and having a hinged connection to the conduit; a line conductor and track supported in the conduit its entire length, except at those portions which have the movable sections, where it passes out of the conduit, combined with a trolley to run on the conductor and track, and suitable means to lift said trolley from the conduit when it leaves the track and conductor at the movable sections of the cover, substantially as described.

5. The combination with an underground conduit provided with a line conductor, and having hinged sections in its cover adapted to be opened, a trolley electrically connected with a motor on a car and running on the line conductor, suitable means to lift the trolley from the conduit through the open hinged sections of the cover, a supplemental contact bar electrically connected to the said motor, and suitable means to bring it into contact with the conductor when the trolley is out of the conduit, substantially as described.

In testimony whereof I affix my signature in presence of two witnesses.

WILLIAM R. DE VOE.

Witnesses:
JOHN HAYDEN,
J. H. GRIFFIN.